Feb. 19, 1929.

W. O. HOTCHKISS ET AL

1,702,868

PHYSICAL INSTRUMENT

Filed June 27, 1927     4 Sheets-Sheet 1

INVENTORS
WILLIAM O. HOTCHKISS
HENRY R. ALDRICH
NOEL H. STEARN
JOHN P. FOERST.
BY Elliott & Harrington
ATTORNEYS Feb. 19, 1929.  W. O. HOTCHKISS ET AL  1,702,868
PHYSICAL INSTRUMENT
Filed June 27, 1927   4 Sheets-Sheet 2

INVENTORS
WILLIAM O. HOTCHKISS,
HENRY R. ALDRICH.
NOEL H. STEARN
JOHN P. FOERST.
By Elliott Harrington
ATTORNEYS Patented Feb. 19, 1929.

1,702,868

UNITED STATES PATENT OFFICE.

WILLIAM O. HOTCHKISS, OF HOUGHTON, MICHIGAN, HENRY R. ALDRICH, OF MADISON, WISCONSIN, NOEL H. STEARN, OF ST. LOUIS, MISSOURI, AND JOHN P. FOERST, OF MADISON, WISCONSIN, ASSIGNORS TO W. C. McBRIDE, INC., OF ST. LOUIS, MISSOURI, A CORPORATION OF DELAWARE.

PHYSICAL INSTRUMENT.

Application filed June 27, 1927. Serial No. 201,949.

This invention relates generally to physical instruments, and more specifically to an improved instrument resembling the dip needle, the predominant object of the invention being to produce instruments of this general type which are practicable and which, being much more sensitive than the dip needles heretofore known, will serve to enlarge the known field of application, and also open up new fields; that is, an instrument which will detect and measure the comparative magnitude of very slight changes in intensity or inclination both from time to time and from place to place in the earth's magnetic field defined here as the total resultant of the normal field either unmodified or modified either by natural or human agency whether controllable or uncontrollable or by any combination thereof.

The primary object of the instrument is to assist in locating deposits of all types of natural resources including oil, coal, non-metallic, and metallic minerals, as well as all materials or bodies natural or artificial which produce directly or indirectly changes in the earth's normal field. The relationship between natural resources and variation in the earth's magnetic field is not necessarily direct although mineral deposits and artificial objects may be directly responsible for changes of an otherwise uniform field. Generally, however, the natural resources, which may have detectable or non-detectable influence on the earth's field, are genetically or structurally related to certain rock formations which, by their differential magnetic permeabilities, may cause detachable changes in the earth's normal field.

The principles involved in the design of this instrument take account of the fact that the core of the earth acts as a magnet and that the outer shell of the earth is within the magnetic field of that magnet. Any magnetic field is represented in terms of lines of force more or less nearly parallel within small space limits. The field is defined as follows:

First, by determining the angular relationship betwen a line of force and the horizontal (inclination); second, by the compass bearing of the vertical plane containing the line of force (declination); and third, by the number of lines of force per unit of cross-sectional area in a section normal to the lines of force (intensity).

Different substances have different capacities for transmitting lines of force. The capacity for transmitting lines of force is called permeability. When a magnetic field occurs in an homogeneous medium such as air, the field as defined by lines of force is symmetrical with respect to a line adjoining the two poles of the magnet. The normal magnetic field of the earth would be symmetrical with respect to the magnetic polar diameter if it were not distorted by the differences in permeability of the substances which form the earth's crust or by the influence of other magnetic fields caused either by natural lodestone or by polarity brought about by either natural or artificial means. All such distortions are included in the changes which our instrument is especially designed to detect.

A small bar magnet mounted at its center of gravity and free to move universally invariably alines itself with the resultant magnetic field, i. e., establishes the space relations of the lines of force of that field. At the magnetic equator it would be horizontal, and at the magnetic poles, it would be vertical. The small magnet then, by alining itself with the lines of force of the earth's magnetic field, can show changes in direction of said lines of force, but cannot quantitatively show changes in intensity thereof. If, however, the small magnet is brought into a position at right angles to the lines of force of the earth's magnetic field, a force will be immediately exerted upon it to make it aline itself. If the upper pole be given just enough additional mass to hold it at right angles to the lines of force of the earth's magnetic field at one certain place and the magnet is moved to another place where the force of the earth's field is different, then the originally applied mass is no longer exactly compensating and the magnet must change its position. Such a change in position then indicates a change in the magnetic force, and the magnitude of the change in the position of the magnet is an index of the magnitude of the change in intensity of the earth's field.

Suppose the additional mass originally applied to the magnet to bring it to a position at right angles to the lines of force of the earth's magnetic field remaining constant; if, then, the magnet is moved to a place where the intensity is the same but the direction of the field has changed, then the magnet will no longer be at right angles to the earth's field, and so the maximum turning moment of the field will no longer be exerted upon it to make it aline. Thus, the counter force will no longer compensate and the magnet will change its position, indicating a change in the direction of the earth's field.

Figures 1, 2, 6:
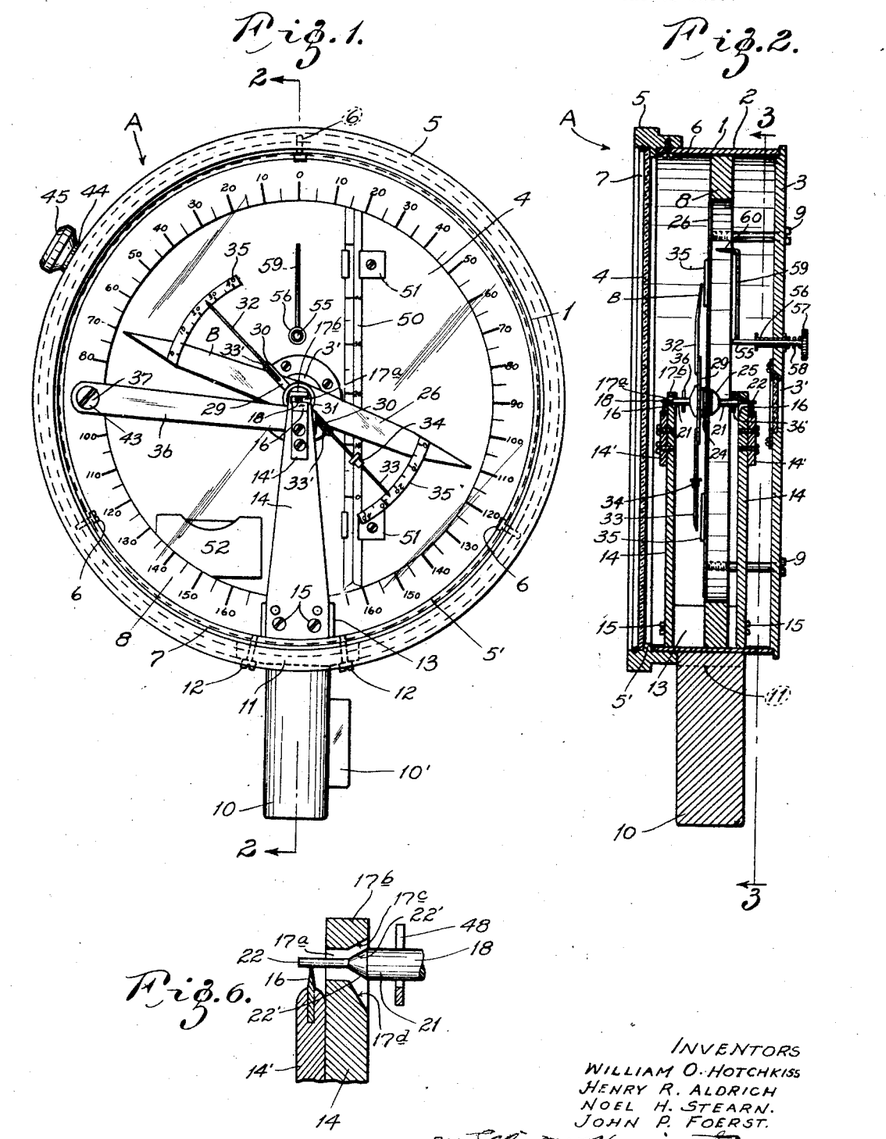
Figure 1 is a front elevation of our instrument.
Figure 2 is a vertical section taken approximately on line 2—2 of Fig. 1.
Figure 6 is an enlarged fragmentary sectional view showing the arrangement for centering the swinging assembly of the instrument transversely of the casing thereof.

Referring now to the drawings, which illustrate the preferred embodiment of our invention, A designates the instrument as a unit. The instrument A comprises a casing or housing 1 composed of an annular side wall 2, a rear wall 3, provided with a sight opening 3' covered by a sheet of transparent material, and a transparent front wall 4. For the purpose of securing the transparent front wall 4 to the casing or housing 1, we prefer to employ a face ring 5 which is secured to the annular side wall 2 of the casing or housing by means of screws or other suitable fastening devices 6 (Figs. 1 and 2). The face ring 5 is provided with an inwardly extended flange 5' which provides a shoulder against which said transparent front wall 4 abuts, and 7 designates a guard member, preferably in the form of a split wire ring, which prevents outward movement of the transparent wall 4 with respect to the face ring.

Located within the casing 1 is a scale ring 8; this scale ring is fixed in any convenient manner to the annular side wall 2 of the casing 1 and extends inwardly therefrom, and said scale ring is provided with graduations indicating degrees of arc arranged on the face thereof which is located adjacent to the transparent wall 4, as shown clearly in Fig. 1. The scale ring 8, as already stated, is fixed within the casing 1, and 9 designates screws or other suitable fastening devices which are passed through apertures in the rear wall 3 of the casing and are screwed into tapped openings in the scale ring for the purpose of securing said rear wall in place on the casing. Arranged at the lower portion of the instrument is a mounting post 10 which has associated with it a flange 11, whereby said post is secured to the casing of the instrument, screws or other suitable fastening devices 12 being extended through said flange 11 and being screwed into threaded openings in the annular wall 2 of the casing to accomplish this purpose. The mounting post 10, which is preferably cylindrical in shape and of constant diameter from end to end, is provided with a key 10' the longitudinal axis of which is in the major plane of the instrument.

Located within the casing 1 of the instrument at the lower portion thereof and fixed rigidly to the annular side wall 2 at its inner face is a block 13, said block, as shown clearly in Fig. 2, being composed of spaced block portions between which the scale ring 8 passes. Extended upwardly from the respective block portions of the block 13 are bearing supports 14, said bearing supports being secured to the outer faces of the block portions by means of suitable fastening devices 15 so as to provide upstanding arms which are spaced from each other in a direction transverse to the major plane of the instrument. Fixed to the bearing supports by being inserted in recesses at the upper edges of members 14' secured to the bearing supports at the upper ends thereof are bearing members 16 having knife edges at their upper edges, each bearing support having one of these bearing members associated with it to provide spaced knife-edge bearings. Each of the bearing supports 14 is provided with an open end slot 17ª which is located a slight distance downwardly from the top edge of the bearing support and extends inwardly from a side edge thereof, as shown clearly in Figs. 1 and 3, in which views the portions of the bearing supports 14 which are located above the slots 17ª are designated by the reference character 17ᵇ. As shown clearly in Fig. 6, the portion 17ᵇ of each of the bearing supports is provided adjacent to the upper edge of the slot 17ª with an inclined face 17ᶜ, and also each bearing support is provided at the lower edge of the slot 17ª with another inclined face 17ᵈ. By referring to Fig. 6, it will be noted also that the members 14' are secured to the associated bearing supports 14 in such position that the knife-edges of the bearing members 16 extend a slight distance above the lower edges of the open end slots 17ª and are spaced downwardly from the top edges of said slots.

Supported by the bearing supports 14 when the instrument is in use is the swinging assembly B of our improved instrument, which includes a pivot 18 having an annular flange 19 formed thereon. The intermediate portion of the pivot 18 is of greater diameter than the remainder thereof, and this intermediate portion is provided with screwthreads 20. The portion 21 of the pivot immediately adjacent to the opposite ends of the intermediate portion thereof are reduced slightly in diameter, as shown clearly in Fig. 4, and at the extreme opposite ends of the pivot, said pivot is provided with bearing portions 22 which are further reduced in diameter. Also, at the points where the outer bearing portions 22 join the portions 21 of the pivot, said pivot is provided with annular inclined faces 22′, as shown in Fig. 6. Screwed on the screwthreaded portion 19 of the pivot is an internally threaded nonmagnetic sleeve 23 having an integrally formed annular flange 24 arranged intermediate of its ends.

Figures 3, 4, 5, 11:
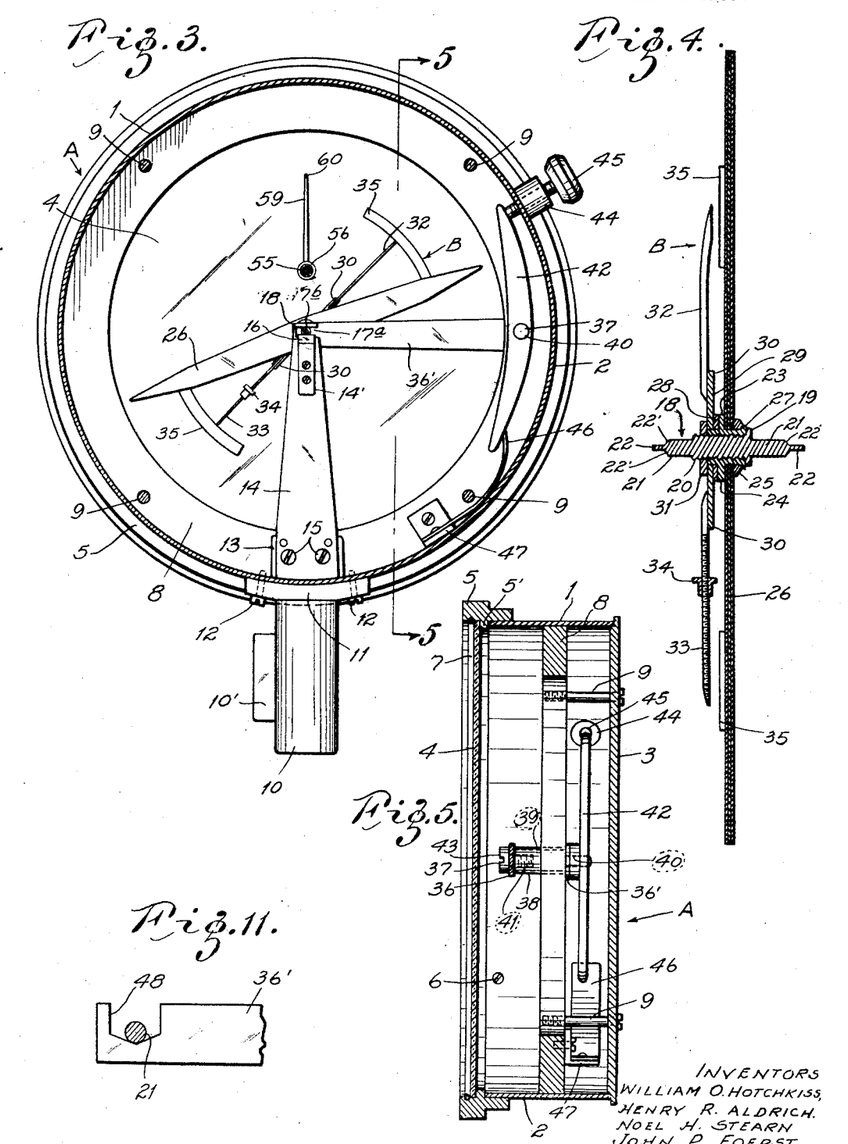
Figure 3 is a vertical section on line 3—3 of Fig. 2 looking in the direction indicated by the arrow.
Figure 4 is an enlarged longitudinal section of the swinging assembly of our improved instrument.
Figure 5 is a vertical section taken approximately on line 5—5 of Fig. 3 and looking in the direction indicated by the arrow.
Figure 11 is a fragmentary detail of one of the arms for raising the swinging assembly off of the knife edges.
Figure 7:
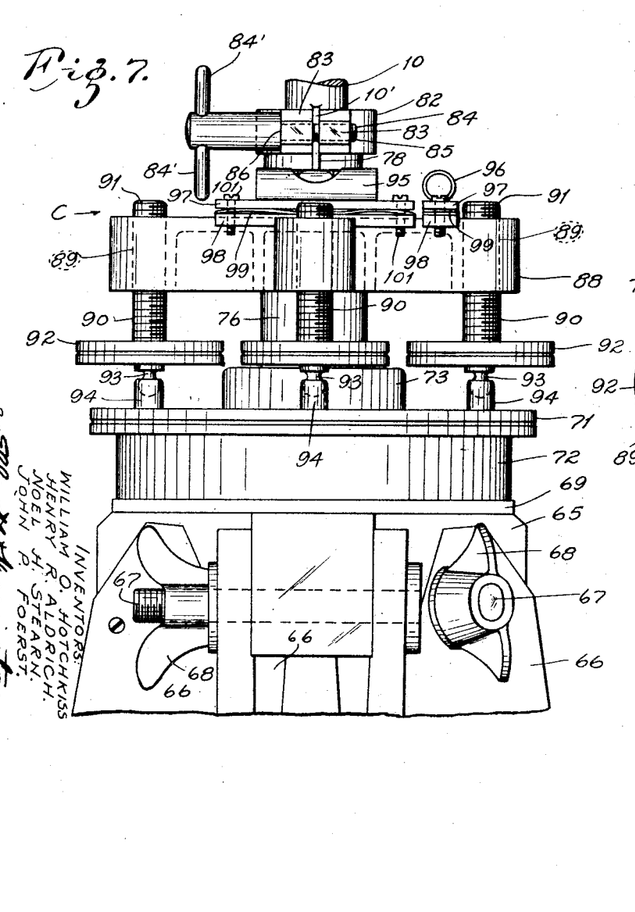
Figure 7 is a side elevation of the improved mounting forming a part of our invention.

Mounted on the sleeve 23 is the magnet 26 of the swinging assembly, said magnet being made of any suitable magnetic material, and may be of laminated construction as shown in the drawing, or of a single thickness of material. The magnet is preferably shaped as shown in Fig. 1, but may have other shapes if desired, and is preferably provided with an opening formed through it at its approximate center of the approximate diameter of the sleeve 23. The magnet 26 is mounted on the sleeve 23 by having said sleeve passed through the opening at the center of said magnet and said magnet is arranged on the sleeve 23 so that it abuts against the annular flange 24, as shown in Fig. 4. Mounted on the sleeve 23 at an end thereof is a guard ring 25 which is arranged to abut firmly against the portion of the magnet 26 surrounding the opening at the center of said magnet, so that this portion of said magnet is closely confined between the integral flange 24 on the sleeve 23 and the guard ring. After the magnet and guard ring have been arranged in place on the sleeve 23, as described, the end portion of said sleeve adjacent to which the guard ring is located is upset or flared outwardly in any suitable manner, as indicated at 27 in Fig. 4, so that said guard ring is maintained in position on the sleeve. In this connection, it is pointed out that the guard ring 25 is provided with an annular curved face at the opening formed through its center against which the upset portion of the sleeve is caused to closely abut. It is obvious that the portion of the magnet adjacent to the opening at the center thereof is very firmly gripped between the annular flange 24 and the guard ring 25, and, therefore, said magnet will be securely fixed to said sleeve. 28 designates a spring lock washer which is arranged on the sleeve 23 adjacent to the annular flange 24.

Mounted on the sleeve 23 of the swinging assembly is a counter-arm 29 which comprises an intermediate portion, including a collar portion, at the center thereof, and two arms 30 extended radially from said collar portion. The collar portion of the counter-arm 29 is provided with an opening formed therethrough, which is of approximately the diameter of the sleeve 23, and 31 designates a lock nut which is screwed on the screwthreaded portion of the pivot, said lock nut being of such diameter that it overlaps the adjacent end of the sleeve 23 and the collar portion of the counter-arm 29, whereby said sleeve and counter-arm are retained in place on the pivot. Fixed to and extended outwardly from the arms 30 of the counter-arm are counter-arm extensions 32 and 33, said extensions being preferably set into recesses 33′ in the outer ends of the arms 30, as shown clearly in Fig. 1, and being fixed in said recesses in any suitable manner. The extension 32 of the counter-arm has a smooth surface, but the extension 33 is provided with extremely fine screwthreads which extend from the outer end of the extension to a point thereon which is adjacent to the outer end of the associated arm 30. Mounted on the screwthreaded extension 33 is a counter-weight 34, said counter-weight having an enlarged head portion and an elongated sleeve portion, and, of course, being provided with a threaded opening formed therethrough. It is obvious that the counter-weight may be adjusted longitudinally of the counter-arm extension to change its location thereon by merely screwing the counter-weight lengthwise of said extension, and the reason for this adjustment and its extreme importance will be subsequently pointed out herein. Fixed to the needle 26 adjacent to its opposite ends are arcuate scales 35 formed of non-magnetic material and provided with graduations indicating degrees of arc. The positions of the arcuate scales 35 on the needle 26 are such that the outer ends of the counter-arm extensions 32 and 33 are located immediately adjacent to said arcuate scales.

By referring to Fig. 4 of the drawings, it will be obvious that if desired, the counter-arm 29 may be moved relative to the needle 26. The lock nut 31 frictionally engages the collar portion of the counter-arm so that it may not be accidentally moved relative to the needle, but this frictional contact between said elements is not such that it will prevent adjustment of the counter-arm when it is desired to move said counter-arm relative to the needle. When the counter-arm is to be adjusted with respect to the needle 26, the arcuate scales will assist the operator in fixing the proper angular relationship between these two elements.

When the swinging assembly of our improved instrument is in place within the casing of the instrument and is in position for use, the opposite reduced end portions 22 of the pivot 18 extend through the slots 17ª in the bearing supports 14 and rest upon the knife edges at the upper portions of the bearing member 16, and because of this arrangement, it is plain that said assembly, if properly leveled, will swing in a vertical plane with the minimum friction. However, when the instrument is not in use, as, for instance, when it is being transported from place to place, it is desirable that the pivot be removed from contact with the knife edges of the bearing member 16 so that these sharp edges will not be injured. To this end, we employ a pair of spaced arms 36 and 36′ which are pivoted to the scale ring 8 at the point indicated by the reference character 37. So as to maintain the arms 36 and 36′ in their proper spaced relationship, we form an opening in the scale ring 8 at the point where the arms 36 and 36′ are to be pivotally mounted and extend through said opening, as shown in Fig. 5, a sleeve 38 which is fixed to said scale ring in any suitable manner. A rod 39 is extended through the sleeve 38, and this rod is provided at one of its ends with a reduced portion 40, and at its other end with a screwthreaded opening 41. At the pivoted end of the arm 36′, said arm is provided with an aperture through which the reduced portion 40 of the rod 39 extends, said arm being abutted against the shoulder provided at the point where the reduced portion 40 joins the rod 39. Mounted on the reduced portion 40 of the rod 39 adjacent to the arm 36′ is a lever 42 having a hub portion at its approximate center. The reduced portion 40 is extended through the hub portion of the lever 42, and said lever is secured to said reduced portion so that the end portion of the arm 36′ will be closely confined between the hub portion of the lever 42 and the shoulder on the rod 39, whereby the free end of said arm 36 will be caused to swing in an arc of a circle when the rod is rotated within the sleeve 38. In like manner, the arm 36 is secured to the rod 39 by a screw or other suitable fastening device 43 which passes through an aperture in the pivoted end of said arm and is extended into the threaded opening 41 in the rod 39 so that the end portion of the arm 36 is confined between the end of the rod 39 and the inner face of the head of the fastening device 43. It is plain, in view of this construction, that rotation of the rod 39 within the sleeve 38 will result in the free ends of both of the arms 36 and 36′ being raised or lowered depending on the direction of rotation of said rod. Arranged on the annular side wall of the casing of the instrument is a boss 44 having a screwthreaded opening formed therethrough, and 45 designates a screw which is extended through said screwthreaded opening and is provided with an enlarged head portion to facilitate rotation of said screw. The inner end of the screw 45 contacts with the lever 42 at a point adjacent to one of its ends, and 46 designates a leaf spring which is secured to a suitable bracket 47 fixed within the casing of the instrument, said leaf spring being adapted to contact with the opposite end of the lever 42 whereby said leaf spring tends to move said lever 42 in a direction opposite to the direction in which it is moved by screwing the screw 45 inwardly. At the free ends of the arms 36 and 36′, said arms are provided with recesses 48 within which the reduced portions 21 of the pivot 18 are located. The bottom wall of each of the recesses referred to is more or less V-shaped, as indicated in Fig. 11.

When the instrument is not in use or is being transported, or when, for any other reason, it is desired to raise the pivot from the knife edges of the bearing member 16, the screw 45 may be rotated in a direction to move the inner end thereof outwardly. The result of this will be that the leaf spring 46 which exerts pressure against the lower end of the lever 42 will move said lower end of said lever inwardly about the pivot 37 of said lever, whereby the upper end of the lever 42 will move outwardly with the inner end of the screw 45, and, therefore, the free ends of the arms 36 and 36′ will be moved upwardly in an arc of a circle drawn from the center of the sleeve 38. As the free ends of the arms move upwardly as described, the pivot will be picked up by the bottom walls of the recesses 48 in said arms, whereby said pivot will be moved off of the knife edges of the members 16. The pivot will then rest in the lowermost portion of the V-shaped bottom walls of the recesses and a continued movement of the free ends of the arms 36 and 36′ in an upward direction will cause said pivot to be clamped between the bottom walls of the recesses in the arms and the portions 17ᵇ of the bearing supports 14 (Fig. 2).

It is obvious, of course, that when it is desired to replace the pivot on the knife edges of the bearing members 16, it will be necessary to merely rotate the screw 45 in a direction to cause its inner end to move inwardly, whereby the lever will be moved in a direction to cause the free ends of the arms 36 and 36′ to be moved downwardly. The V-shaped bottom walls of the recesses 48 in the arms 36 and 36′ function as centering devices for the pivot inasmuch as the inclined portions of said bottom walls will cause said pivot to move to the lowermost points thereof, which are at the centers of said bottom walls, and, therefore, the pivot portions 22 will be placed in contact with the same portions of the knife edges each time said pivot portions are lowered into contact with said knife edges. In like manner, we provide means for shifting the swinging assembly laterally of the casing of the instrument if said swinging assembly should be shifted from its proper lateral position within said casing, this means comprising the inclined faces 17ᶜ formed on the portions 17ᵇ of the bearing supports 14 and the annular inclined faces 22′ on the pivot 18. The last mentioned means is brought into operation when the pivot 18 is raised from the knife edges by the arms 36 and 36′. If, when the pivot 18 is raised by the arms 36 and 36′, said pivot is out of its proper lateral position within the casing, one or the other annular inclined faces 22′ will engage the associated inclined face 17ᶜ on one of the bearing supports 14. The result of this will be that the pivot will be shifted laterally to its proper lateral position. The means for centering the pivot so that it is always caused to contact with the same portions of the knife edges (the V-shaped bottom walls of the recesses 48 at the outer ends of the arms 36 and 36′) and the means for shifting the pivot transversely of the casing so as to cause the same portions of the pivot to contact with the knife edges every time said pivot is lowered onto the knife edges (the inclined faces 17ᶜ on the bearing supports 14 and the annular inclined faces 22′ on the pivot) are extremely important features of our invention in that they cause the same portions of the pivot and the same portions of the knife edges to be in contact every time a reading of the instrument is being taken. The extreme importance of this results from the fact that the portions 22 of the pivot and the knife edges may not be absolutely uniform throughout. These parts are made with the greatest of care, but in spite of this, if they were viewed through a microscope the faces thereof which contact when the instrument is in use would be quite irregular. If, therefore, a reading were taken when certain portions of the knife edges and pivot were in contact, and a second reading were taken when different portions of the knife edges and pivot were in contact, the conditions at the pivot points of the swinging assembly may not be the same during both readings and hence the accuracy of the instrument would be affected. In the use of our improved instrument, however, the pivot 18 is centered every time it is raised from the knife edges and as a result of this the same portions of the pivot will contact with the same portions of the knife edges every time the pivot is lowered onto the knife edges, whereby a uniformity of conditions at the pivot points of the swinging assembly will result.

Since temperature changes cause changes in the position of the magnet comparable to those caused by changes in the magnetic field, it is absolutely essential to correct for the effect of temperature changes. To do this, we employ a thermometer 50 which is installed within the casing of the instrument, said thermometer being secured in place by suitable brackets 51, preferably to the rear wall of the casing of the instrument. In this connection also, we propose, if it is found to be necessary or desirable, to eliminate the effect of temperature changes on the counter-arm by making the extensions 32 and 33 of said counter-arm of materials having different coefficients of expansion. Because of this arrangement, the expansion of one counter-arm extension will be compensated by the other extension.

The instrument as a unit is provided with a leveling device 52, preferably of the bubble type, which is secured within the casing of the instrument, whereby said instrument may be properly level. The leveling device 52 is arranged exactly parallel with the knife edge of each of the members 16 and its function is to aid in determining the horizontality of the individual knife edges, it being plain, because of the parallel arrangement of the leveling device and the members 16, that the knife edges of the members 16 will be horizontal when the bubble of the leveling device shows that said leveling device is horizontal. This leveling device, however, will not assist in determining whether or not the associated knife edges are in the same horizontal plane with respect to each other, this function being performed by other leveling devices which will be subsequently set forth herein. Due to the transparent front wall 4, the sight opening 3′ in the rear wall 3 and the cut-out portions 17ᵃ in the pivot guides 17, the user of the instrument may see the knife edges and pivot 18 at the points where they contact with each other when the instrument is in use.

In the use of our improved instrument, each time a reading is to be taken it is advisable to bring the swinging assembly B to a certain position with respect to the scale ring and permit said assembly to swing from that point. To provide for moving the swinging assembly to this certain position, we employ a mechanism which is clearly shown in Fig. 2 and which comprises a rod 55 supported for longitudinal and rotary movement within a sleeve 56 fixed in an opening formed in the rear wall of the casing. The rod 55 is provided at its outer end with a knurled head 57 and 58 designates a coil spring which surrounds said rod and bears at its opposite ends against the head 57 and the outer end of the sleeve 56, respectively, said coil spring tending to move the rod 55 outwardly. 59 designates an arm which is secured to the rod 55 at the inner end thereof, said arm being provided with a laterally extended portion 60.

When it is desired to set the swinging assembly to any particular point on the ring scale, the rod 55 will be moved inwardly by pressing on the head 57. This will cause the portion 60 of the arm 57 to overlap the path of travel of the needle 26 of the swinging assembly and if the rod is then rotated by turning the head 57, the needle 26 will be picked up by the rotating portion 60 of the arm 59 and said needle, together with the associated parts, comprising the swinging assembly, will be moved to the desired position. It is obvious, of course, that when the inward pressure on the rod 55 is relieved, the coil spring 58 will move the rod outwardly and, of course, when said rod is in its outermost position, as shown in Fig. 2, the portion 60 of the arm 59 will be out of the path of travel of the needle 26.

Because of its construction, it has been found that our improved instrument will not function in an entirely successful manner when supported on the ordinary tripod mounting, and we have, therefore, devised a special mounting which will now be described.

Referring now to Figs. 7, 8, 9 and 10 of the drawings, C designates our improved mounting, which comprises a tripod head 65 to which the legs 66 of the mounting are pivotally secured in the usual manner, which ordinarily includes bolts 67 provided with wingnuts 68. Mounted on and fixed to the tripod head 65 is a member 69 having an upwardly extended screwthreaded portion 70 (Fig. 9). 71 designates the leveling head platform of our improved mounting which is provided with an annular downwardly extended portion 72 provided with internal screwthreads. The leveling head platform 71 is mounted on the tripod head 65 by being screwed on the screwthreaded portion 70 of the member 69, as shown clearly in Fig. 9 of the drawings. The leveling head platform 71 is provided at its center with an upwardly extended hollow portion 73 provided with an aperture 74 formed through its top wall, the hollow interior of said portion 73 providing a socket 75 which is for a purpose to be hereinafter set forth.

76 designates the mounting socket of our improved mounting which comprises an elongated tube having external screwthreads at its lower end. The longitudinal opening through the tube 76 is provided with a portion of enlarged diameter adjacent to the upper end of said tube, as indicated by the reference character 77, and the wall of the tube is provided with a slot 78 which extends downwardly from the top edge of the tube, at which top edge of said tube said slot 78 is open. The elongated tube 76 is provided at its upper end with a reduced portion 80 at the lower end of which a shoulder 81 is arranged, as shown clearly in Fig. 9. Mounted on the elongated tube 76 at the reduced upper portion thereof is a split collar 82 provided with a pair of integrally formed spaced ears 83 which extend outwardly from the elongated tube at the opposite sides of the slot 81. The split collar 82 contacts with the shoulder 81 on the elongated tube and said split collar is fixed to said elongated tube so that the space between the ears 83 of said split collar is in alignment with the slot 78 at the upper end of the elongated tube by means of a screw 82' which passes through said split collar and into an aperture in the tube 76. Extended through screwthreaded apertures in the ears 83 is a clamping screw 84 provided with radial pins 84' which facilitate rotation of said screw. The portion 85 of the clamping screw which is provided with screwthreads is reduced in diameter and a shoulder 86 is provided where this reduced portion joins the remainder of said clamping screw. The tube 76 is formed of material possessed of some resiliency, and it is obvious, therefore, when the shoulder 86 is brought into contact with a face of one of the ears 83 and the clamping screw is rotated in the proper direction, the ears 83 will be drawn toward each other, whereby the upper portion of the tube 76 will be contracted slightly, thus providing for gripping an element which may be extended into the enlarged upper portion of the opening, formed through the tube.

The lower portion of the tube 76 is extended through the aperture 74 in the top wall of the upwardly extended portion 73 of the leveling head platform, and is located within the socket 75 provided by said portion 73, and 87 designates a collar which is mounted on the tube 76 by being screwed on the screwthreaded lower end thereof so that said collar is positioned within said socket 75. The collar 87 is provided with a curved face 87' which is located adjacent to a correspondingly curved face 75' within the socket 75, whereby a universal joint between the leveling head platform and the mounting socket is provided.

Figure 8:
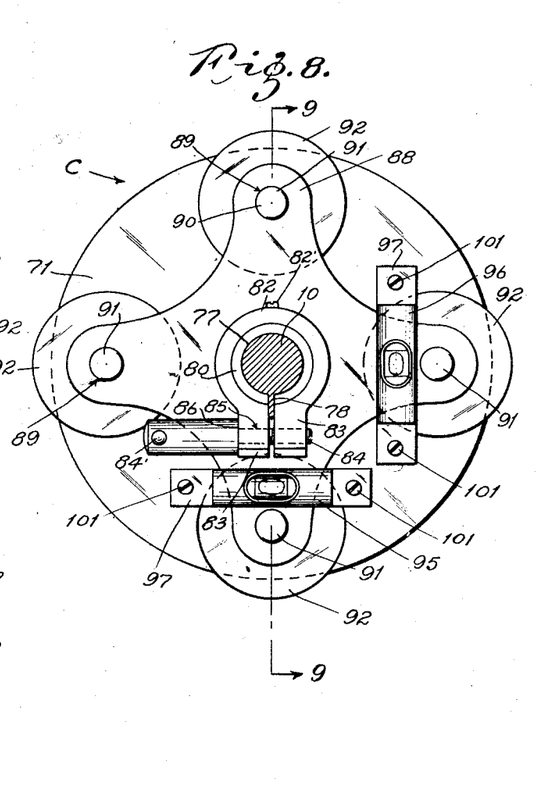
Figure 8 is a plan view of the mounting shown in Fig. 7.
Figure 9:
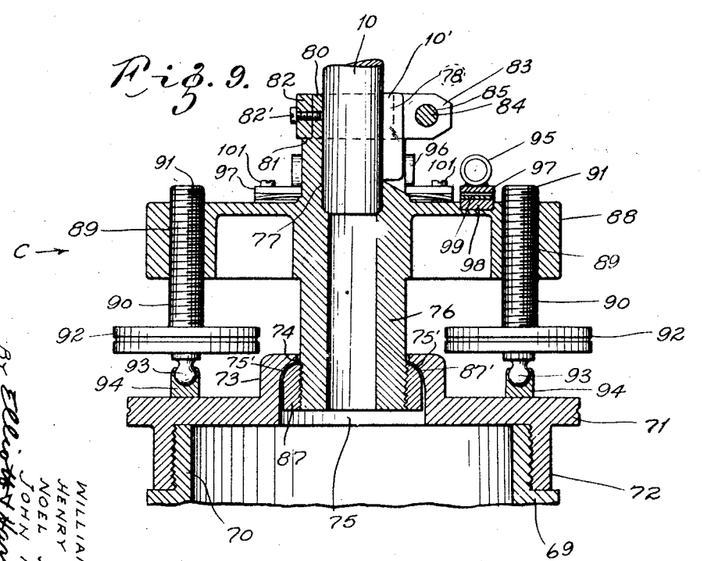
Figure 9 is a section on line 9—9 of Fig. 8.
Figure 10:
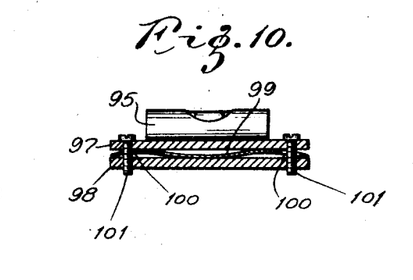
Figure 10 is a section detail of one of the adjustable leveling devices of our improved mounting.

Fixed on the elongated tube 76 at a point intermediate its upper and lower ends is the leveling head 88 of our improved mounting, which when viewed in plan, is preferably shaped as shown in Fig. 8. The leveling head may be formed integral with the tube 76 or may be separable and fixed thereto as desired, and said head is provided with a plurality of screwthreaded apertures 89 formed therethrough. 90 designates a plurality of leveling screws by means of which the leveling head may be adjusted as to horizontality. Each of the leveling screws comprises a screwthreaded portion 91 which is passed through one of the threaded apertures in the leveling head, an enlarged portion 92 to facilitate manipulation of the screws and a spherical lower portion 93 adapted to extend into a suitably shaped seat in a shoe 94, which contacts with the top face of the leveling platform 81.

The shoes 94 are secured to the spherical lower ends of the leveling screws by drawing the metal of the shoe about the curved upper portion of said spherical portions.

Mounted on the leveling head 88 is a pair of leveling devices 95 and 96, preferably of the bubble type, said leveling devices being arranged at right angles with respect to each other, as shown clearly in Fig. 8. Each of the leveling devices includes an elongated bar 97 to which the tubular portion of the level proper is secured in any suitable manner, and 98 designates bars which are secured to the leveling head for the purpose of supporting the leveling devices. The bars 98 are fixed to the leveling head in any suitable manner and said bars are of approximately the same dimensions as the bars 97 forming parts of the leveling devices, the last mentioned bars being arranged immediately above the bars 98 with a slight space therebetween, as shown clearly in Fig. 10. Interposed between each pair of associated bars 97 and 98 is a leaf spring 99 which is curved so that it tends to separate said bars. The leaf springs 99 are each provided with elongated apertures 100 adjacent to the opposite ends thereof, and 101 designates screws which pass through openings at the opposite ends of the bars 97 and 98 and through the elongated apertures 100 in the leaf springs 99. The openings in the bars 98 through which the screws 101 pass are screwthreaded and the enlarged head portions of said screws 101 contact with the top faces of the bars 97 whereby said bars 97 may be adjusted relative to the associated bars 98 by manipulating the screws 101.

The first step necessary in preparing for the use of our improved instrument is to determine the direction of the vertical plane of the magnetic meridian, as our improved instrument is to be set in that plane. This plane is determined by a magnetic compass (not shown) which is provided with a mounting post resembling the mounting post 10 of our instrument, the mounting post of the compass being of such length and diameter that it will fit into the upper portion of the opening formed through the mounting socket of the mounting C and being provided with a key resembling the key 10' of the instrument post 10. The mounting post of the compass is extended into the opening in the mounting socket of the mounting and the key is arranged within the open-end slot 78 in the tube 76, after which the mounting post of the compass is clamped in the upper end of the mounting socket by tightening the clamping screw 84. The mounting is then turned if necessary until the transverse dimension of the slot 78 is parallel with the magnetic meridian as determined by the needle of the compass.

When the mounting has been set as described, the clamping screw 84 will be unscrewed and the compass will be removed from the mounting, after which our instrument will be mounted on the tripod by introducing the mounting post 10 into the opening in the mounting socket and with the key 10' in the slot 78, after which said mounting post will be firmly clamped in place by tightening the clamping screw 84. Due to the fact that the key 10' is in the major vertical plane of the instrument and as said key is located in the slot 78, which is arranged in the direction of the magnetic meridian, it is plain when our instrument has been mounted on the tripod as described that said instrument will be in the plane of the magnetic meridian. When the instrument has been mounted on the tripod, the instrument will be leveled by manipulating the leveling screws 90, this operation being aided by reference to the bubble levels 95 and 96 on the leveling head 88 and the bubble level 52 within the instrument. The pivot is then lowered into contact with the knife edges of the bearing members 16 and the swinging assembly is permitted to swing. The operator will watch the pivot and the knife edges very closely during the swinging of the assembly B, the opposite ends of the pivot being visible through the front transparent wall of the casing and through the sight opening 3' in the rear wall of said casing, in order to determine whether any portion of the pivot is impinging against the knife edges or bearing supports 14, for if the pivot does so impinge it indicates that one of the knife edges is in a lower horizontal plane than the associated knife edge, which causes the pivot to creep laterally of the casing as the assembly swings. In the event the pivot impinges against the knife edges of the bearing supports 14, the leveling head will be adjusted by manipulating certain of the leveling screws until it has been determined that the swinging assembly swings freely. The adjustable level bubble arranged transversely of the plane of the instrument is then properly adjusted.

The next step is to determine the direction of the lines of force of the earth's magnetic field, which is done by removing the counter-weight 34 and arranging the counter-arm so that it is parallel with the axis of the needle 26. The swinging assembly will then aline its magnet with the direction of the lines of force of the magnetic field and the angle of inclination of these lines of force may be had by referring to the ring scale 8. The angle between the extensions of the counter-arm and the axis of the needle 26 determines the sensitivity of the instrument and the counter-arm is next adjusted to the desired angle, after the counter-weight 34 has been applied to the counter-arm extension 33. The counter-weight is adjusted to a position on the counter-arm which will cause the needle to come to rest approximately at right angles to the inclination of the lines of force of the earth's magnetic field, the arcuate scales 35 being utilized for fixing the proper angle between the counter-arm and the needle. The angle between the counter-arm and the axis of the needle is determined after the angle of inclination of the earth's field has been fixed with reference to the horizontal and the complement to this angle becomes the maximum limit for the angle to be set off on the arcuate scales. In this connection, if the maximum sensitivity is desired, the angle set off on the arcuate scales should depart from the maximum limit only by that amount which is a measure of the friction. This adjustment requires set and try procedure. After the adjustments with respect to the angle between the counter-arm and the needle have been made and the counter-weight has been properly positioned on the counter-arm, the temperature coefficient is determined and the instrument is ready for a reading.

To take a reading, the swinging assembly of the instrument is brought to a certain position with respect to the ring scale, preferably the zero position, by moving the rod 55 extended through the rear wall of the instrument inwardly so that the portion 60 of the arm 59 fixed to said rod will contact with the needle 26 of the swinging assembly, whereby rotary movement of the rod 55 will move the needle to the desired position. When the swinging assembly has been brought to its starting position, and this position will be the same each time a reading is taken, the portion 60 of the arm 59 will be moved out of the path of travel of the needle 26 and the swinging assembly will be permitted to swing, the initial position of the needle and the end of the swing being recorded. The swinging assembly is caused to swing as described in order that the momentum of the swing may overcome friction inherent in the contact between the knife edges of the members 16 and the pivot.

In leveling our improved instrument preparatory to taking a reading, we have found that wind pressure may move the instrument out of its proper position so that the knife-edge bearings, which in the absence of wind pressure would be in exactly the same horizontal plane, will be in different horizontal planes. The result of this would be that the pivot of the swinging assembly would creep transversely of the casing of the instrument and would impinge against the knife-edge bearing members or against the bearing supports 14. To avoid this condition, we provide the instrument mounting with the leveling devices 95 and 96, already referred to, which may be adjusted relative to the leveling head. In the event our instrument has been set up and leveled and wind pressure against the instrument moves the instrument out of its true position so that the knife edges are not in the same horizontal plane, the operator will manipulate the leveling screws associated with the leveling head of the tripod until tests made by permitting the swinging assembly to swing show that the knife edges are in exactly the same horizontal plane. This manipulation, of course, will throw the levels 95 and 96 out of their leveled positions, and, therefore, when the instrument is moved from one location to another, the operator will not be able to determine the exact setting of the instrument at the previous location. We have, therefore, arranged the levels 95 and 96 so that they are adjustable with respect to the leveling head of the tripod. Hence, when the instrument has been adjusted for wind pressure as described and the levels 95 and 96 moved from their leveled condition, the operator, by manipulating the screws 101 associated with the levels 95 and 96, may adjust said levels so as to properly level same. In view of this arrangement, the instrument may be set for a certain wind pressure and it will not be necessary, therefore, to adjust the instrument for wind pressure each time it is set up.

It has been found that when needle 26 is balanced as described, said needle is in unstable equilibrium and the turning moments of gravity and the magnetic field are equal and opposite in their effect on the needle. Hence, the slightest change in the magnetic force, either increase or decrease, results in changing the position of the needle. It is obvious that the only bar to infinite sensitivity in the instrument is the lack of mechanical perfection in its making, and it is likewise plain that any degree of sensitivity desired may be obtained by varying the angle between the counter-arm and the long axis of the needle. Field work has proved that this instrument may be adjusted so that it can be made to react to changes in the earth's magnetic field with a sensitivity of the order of magnitude of twenty times the sensitivity shown by the average ordinary dip needle.

Up to this point we have stressed particularly changes in field intensity and the sensitivity of our instrument thereto. We can now demonstrate that the combination of the counter-arm 29, adjustable to any angle desired which will be indicated on the arcuate scales 35, and the adjustable counter-weight 34 borne by the counter-arm 29, by means of all of which we control the sensitivity of the swinging magnet to minute changes of intensity, has been so designed that the instrument adapts itself to minor changes in inclination in such a manner that wherever maximum sensitivity is most desired the sensitivity will automatically approach theoretical infinity and depart therefrom by an amount limited only by constructional detail influencing friction.

Intensity changes are always accompanied by greater or less changes of declination and inclination, as defined by lines of force. When the instrument is adjusted in the manner previously described herein and with the counter-arm 29 setting off on the arcuate scale an angle approximating the complement of the angle of regional inclination and departing therefrom by no less than an amount representing effective friction, and with the counter-weight 34 so placed that the swinging magnet indicates its position of rest to be at right angles to the lines of force in the plane of the magnetic meridian, then wherever the inclination and intensity of the field have identical values the magnet will register this same position. However, where different values are encountered at succeeding stations, since inclination has changed, sensitivity to intensity also has changed. If the angle set off on the arcuate scales 35 be less than the amount affording infinite sensitivity to changes of intensity at the given inclination, and if the inclination steepens by such an angle that the angle set off on the arcuate scales 35 becomes the complement of the steepened inclination, then the instrument becomes automatically possessed of theoretical infinite sensitivity to the changed intensity.

By reason of this feature in the design of the instrument, when it is used for reconnaissance, those adjustments made for maximum practical sensitivity to intensity changes in the regional inclination, automatically adapt themselves to higher sensitivity wherever local distortions have steepened the regional inclination. Thus, the instrument automatically attains its optimum of working sensitivity whenever it encounters the actual conditions it is designed to detect. For extremely refined detail, the adjustments can be so arranged as to yield theoretically infinite sensitivity in strategic locations.

While we have shown in the drawings and described in the specification one embodiment of our invention, we do not wish to be limited to the precise construction disclosed nor to any specific materials, as it is obvious that the invention comprehends changes, variations and modifications which come within the scope of the claims hereunto appended.

The instrument mounting shown, but not claimed in this application is claimed in an application filed in the name of Noel H. Stearn on December 31st, 1928, which application bears Serial Number 329,599.

We claim:

1. An instrument comprising a magnet mounted to swing in a vertical plane, a counter-arm movable with said magnet and angularly adjustable with respect thereto, and means for indicating the degree of angularity between said magnet and said counter-arm.

2. An instrument comprising a magnet mounted to swing in a vertical plane, a counter-arm movable with said magnet and angularly adjustable with respect thereto, and means fixed to said magnet for indicating the degree of angularity between said magnet and said counter-arm.

3. An instrument comprising a magnet mounted at its approximate longitudinal center so as to swing in a vertical plane, and a counter-arm mounted intermediate of its ends at a point in horizontal alinement with the point of support of said magnet, said counter-arm being movable with said magnet and being angularly adjustable with respect thereto.

4. An instrument comprising a magnet mounted to swing in a vertical plane, a pivot by which said magnet is supported, supports for said pivot, and a counter-arm supported intermediate of its ends by said pivot, said magnet, said pivot, and said counter-arm being movable as a unit and said counter-arm being angularly adjustable with respect to said magnet.

5. An instrument comprising a magnet mounted to swing in a vertical plane, a pivot by which said magnet is supported, supports for said pivot, a counter-arm supported intermediate of its ends by said pivot, said magnet, said pivot and said counter-arm being movable as a unit and said counter-arm being adjustable with respect to said magnet, and friction means for preventing accidental movement of said counter-arm with respect to said magnet.

6. An instrument comprising a magnet mounted to swing in a vertical plane, a counter-arm movable with said magnet and angularly adjustable with respect thereto, and a counter-weight mounted on said counter-arm and adjustable thereon.

7. An instrument comprising a magnet mounted to swing in a vertical plane, a screwthreaded counter-arm movable with said magnet and angularly adjustable with respect thereto, and a screwthreaded longitudinally adjustable counter-weight on said screwthreaded counter-arm.

8. An instrument comprising a magnet mounted to swing in a vertical plane, a pivot by which said magnet is supported, supports for said magnet on which said pivot rests, and means whereby said pivot may be adjusted longitudinally of its major axis with respect to said supports.

9. An instrument comprising a magnet mounted to swing in a vertical plane, a pivot by which said magnet is supported, supports for said pivot, a screwthreaded counter-arm supported intermediate of its ends by said pivot, said magnet, said pivot, and said counter-arm being movable as a unit and said counter-arm being angularly adjustable with respect to said magnet, and a screwthreaded longitudinally adjustable counter-weight on said screwthreaded counter-arm.

10. An instrument comprising a magnet mounted to swing in a vertical plane, a pivot by which said magnet is supported, supports for said magnet on which said pivot rests, said pivot being provided with inclined faces and said supports for said pivot being provided with corresponding inclined faces located in vertical alinement with respect to the inclined faces on said pivot, and means for moving said pivot off of said supports by raising same therefrom.

11. An instrument comprising a magnet mounted to swing in a vertical plane, a pivot by which said magnet is supported, supports for said pivot on which said pivot rests, means whereby said pivot may be moved off of said supports, said means including an arm pivoted to a fixed part of the instrument and arranged to contact with said pivot and move same upwardly, and having an inclined face with which said pivot may contact.

12. An instrument comprising a magnet mounted to swing in a vertical plane, a pivot having cylindrical portions by which said magnet is supported, supports for said pivot on which said pivot rests, means whereby said pivot may be moved off of said supports by being raised therefrom, said means including spaced arms provided with recesses having inclined faces therein in which the cylindrical portions of said pivot are adapted to rest.

13. An instrument comprising a magnet mounted to swing in a vertical plane, a pivot having cylindrical portions by which said magnet is supported, supports for said pivot on which said pivot rests, means whereby said pivot may be moved off of said supports by being raised therefrom, said means including spaced arms provided with recesses having convergent inclined faces therein in which the cylindrical portions of said pivot are adapted to rest.

14. An instrument comprising a magnet mounted to swing in a vertical plane, a pivot by which said magnet is supported, supports for said pivot, means having inclined faces whereby said pivot may be shifted longitudinally of its major axis, and means including an arm provided with an inclined face whereby said pivot may be shifted at an angle to its major axis.

15. An instrument comprising a magnet mounted to swing in a vertical plane, a pivot by which said magnet is supported, said pivot being provided with inclined faces, supports for said pivot, said supports being provided with inclined faces, means whereby said pivot may be moved off of said supports by being raised therefrom, to move the inclined faces on said pivot into contact with the inclined faces on said supports, said means for elevating said pivot including spaced arms provided with recesses having inclined faces arranged therein within which portions of said pivot are extended.

16. An instrument comprising a magnet mounted to swing in a vertical plane, a counter-arm movable with said magnet and angularly adjustable with respect thereto, a pivot by which said magnet is supported, supports for said pivot, means for moving said pivot off of said supports, means for adjusting said pivot longitudinally of its major axis with respect to said supports, and means associated with the means for moving said pivot off of said supports for adjusting said pivot at an angle with respect to its major axis.

In testimony whereof, we have hereunto set our hands.

WILLIAM O. HOTCHKISS.
HENRY R. ALDRICH.
NOEL H. STEARN.
JOHN P. FOERST.